United States Patent [19]
Frantz et al.

[11] Patent Number: 5,172,934
[45] Date of Patent: Dec. 22, 1992

[54] OCCUPANT RESTRAINT SYSTEM

[75] Inventors: Brian H. Frantz, Royal Oak; Jack L. Jensen, Highland; Gregory A. Miller, Troy, all of Mich.

[73] Assignee: General Motors Corporation, Detroit, Mich.

[21] Appl. No.: 752,132

[22] Filed: Aug. 29, 1991

[51] Int. Cl.⁵ .................. B60R 21/20; B60R 21/26; B60R 21/22
[52] U.S. Cl. .................. 280/740; 280/742; 280/730; 280/743; 280/731
[58] Field of Search .............. 280/728, 743, 736, 740, 280/742, 730, 731

[56] References Cited

U.S. PATENT DOCUMENTS 3,827,715  8/1974  Lynch ................ 280/731
4,013,305  3/1977  Ichihara ............. 280/740
5,009,452  4/1991  Miller ............... 280/731

FOREIGN PATENT DOCUMENTS 0136945  6/1991  Japan ................ 280/728

Primary Examiner—Charles A. Marmor
Assistant Examiner—Tamara L. Graysay
Attorney, Agent, or Firm—Charles E. Leahy

[57] ABSTRACT

An occupant restraint system includes a folded cushion and a reaction member mounted to the support of the system by a strap. The reaction member is pocketed to the inside of the upper wall of the cushion by flaps to seal the interface between the reaction member and the upper wall of the cushion. The flaps are located at the ends of legs of strip members which are arranged in cruciform fashion relative to each other and have their bights crossing the reaction member. The legs and flaps of the strip members are folded relative to each other and sandwiched between the reaction member and a retainer member secured to the reaction member.

4 Claims, 3 Drawing Sheets

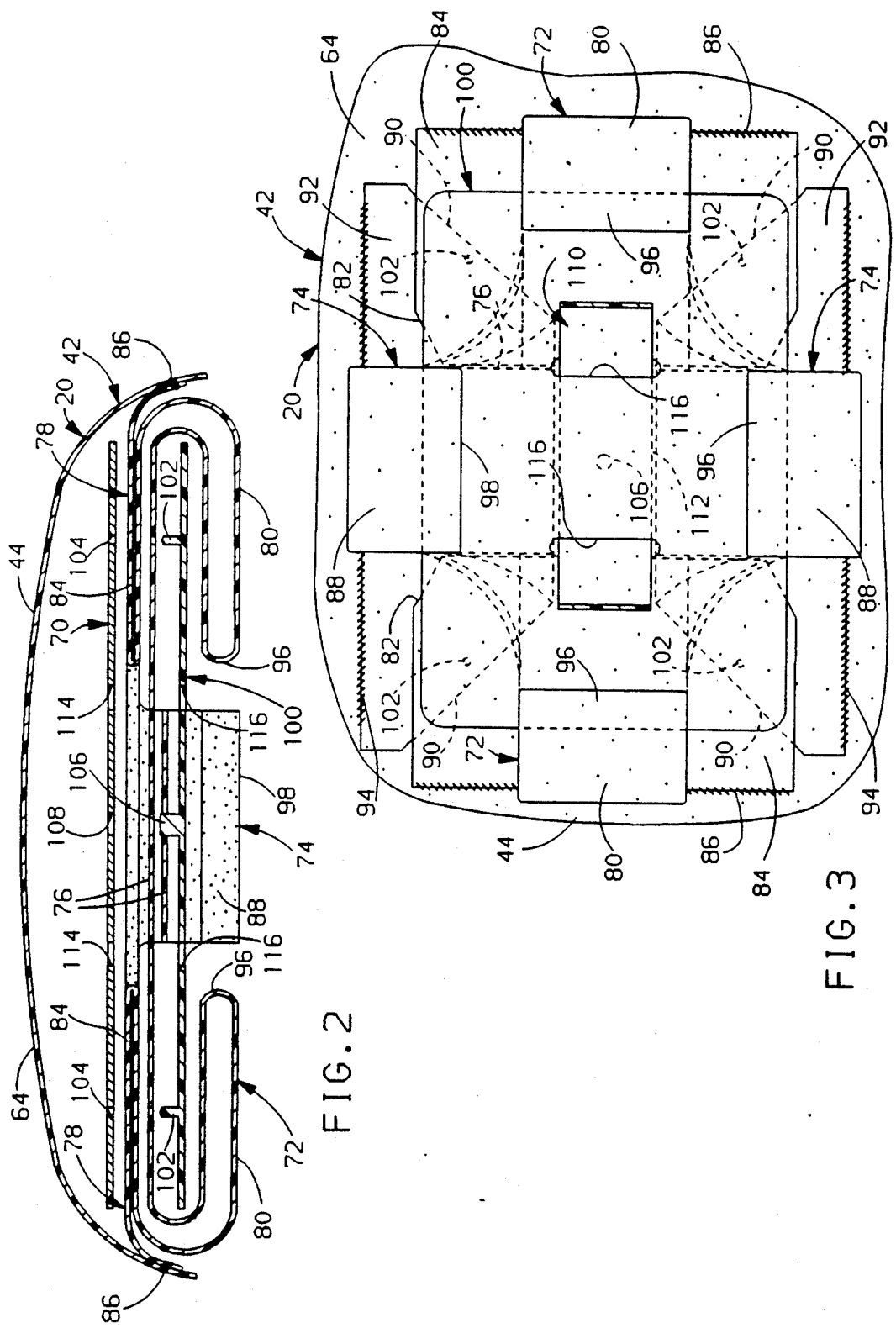

5,172,934

1

OCCUPANT RESTRAINT SYSTEM

BACKGROUND OF THE INVENTION

This invention relates to occupant restraint systems and more particularly to occupant restraint systems of the type which releasably secure the cushion against initial deployment normal to or toward the occupant and direct such initial deployment laterally of the occupant.

U.S. Pat. No. 5,009,452, Occupant Restraint System, issued Apr. 23, 1991 to Gregory A. Miller and assigned to the assignee of this invention, discloses an occupant restraint system which includes a reaction member mounted to the support of the restraint module and located above the inflator of an occupant restraint system. The reaction member is sealed to the upper wall portion of the occupant restraint cushion to prevent the impingement of pressure fluid from the inflator against such upper wall portion during initial deployment of the cushion and thereby restrict such initial deployment laterally of the occupant through the unfolding of the folded side and end walls of the cushion.

Copending application Ser. No. 07/752,133 Occupant Restraint System, filed Aug. 29, 1991, Frantz et al. and assigned to the assignee of this invention discloses a reaction member type system wherein the reaction member is mounted to the support by a flexible mounting member which is looped through the reaction member and a retainer member and has the legs thereof secured to the support of the system. The reaction member is pocketed to the inside of the upper wall of the folded cushion by flaps of flexible material. The flaps can be individual flaps which overlap and are secured to the inside of the upper wall of the folded cushion adjacent the periphery of the reaction member. Alternatively, the flaps can be part of a separable sheet of material having its edge portions secured to the inside of the upper wall of the cushion adjacent the periphery of the reaction member. Both types of flaps, individual flaps or separable flaps of a sheet of flexible material, are releasably secured to the reaction member by the retainer member which sandwiches the flaps to the reaction member and is secured thereto.

The occupant restraint system of this invention is of the foregoing types but additionally includes a tether arrangement for tethering the upper wall of the cushion to the support when such upper wall is deployed normal to or toward the occupant. In a preferred embodiment of the system, strip members of flexible material have their end portions formed into outwardly flaring shaped flaps. The strip members are arranged in cruciform fashion with their bights or center portions crossing each other over the reaction member. The edges of the flap end portions of the strip members are sewn or otherwise secured to the inside of the upper wall of the cushion adjacent opposite respective edge portions of the reaction member. The flap end portions of the strip members overlap each other and overlie respective edge portions of the reaction member to pocket the reaction member to the inside of the upper wall of the cushion. The leg portion of each strip member between the center portion and a respective end portion is folded over such end portion and over itself. The retainer member holds the end portions and folded leg portions against the reaction member. When the upper wall of the cushion deploys normal to or toward the occupant in a subsequent stage of deployment, the leg portions and flap end portions of the strip members act as tethers to tether the upper wall to the reaction member.

The primary feature of this invention is to provide an occupant restraint system having tether means which (1) pockets a reaction member to the inside of the upper wall of the cushion to delay initial deployment of such upper wall toward the occupant; and, (2) tethers such upper wall when such upper wall is subsequently deployed toward the occupant. Another feature is that the tether means include strip members of flexible material and the pocket is provided by the end portions of such the strip members of flexible material. A further feature is that the end portions of the strip members of flexible material provide flaps which overlap each other and overlie the periphery of the reaction member to pocket the reaction member to the upper wall of the cushion. Yet another feature is that the edges of the end portions of such strip members of flexible material are sewn or otherwise secured to the inside of the upper wall of the cushion adjacent respective edge portions of the reaction member. Yet a further feature is that the strip members of flexible material are arranged in cruciform fashion with the bights or center portions of the strip members of flexible material crossing each other over the reaction member. Still another feature is that the leg portions of the strip members of flexible material, between the center portions thereof and the end portions thereof, are folded over the end portions and over a respective end portion. Still a further feature is that the center portions, end portions and folded over leg portions of the strip members of flexible material are sandwiched between the reaction member and retainer member. Yet another feature is that the end portions of the strip members of flexible material are of outwardly flaring shape and are arranged in overlapping pairs.

These and other features of this invention will be readily apparent from the following specification and drawings wherein:

FIG. 2 is an exploded view of a portion of FIG. 1.

FIG. 3 is a view taken along line 3—3 of FIG. 1; and,

Figure 1:
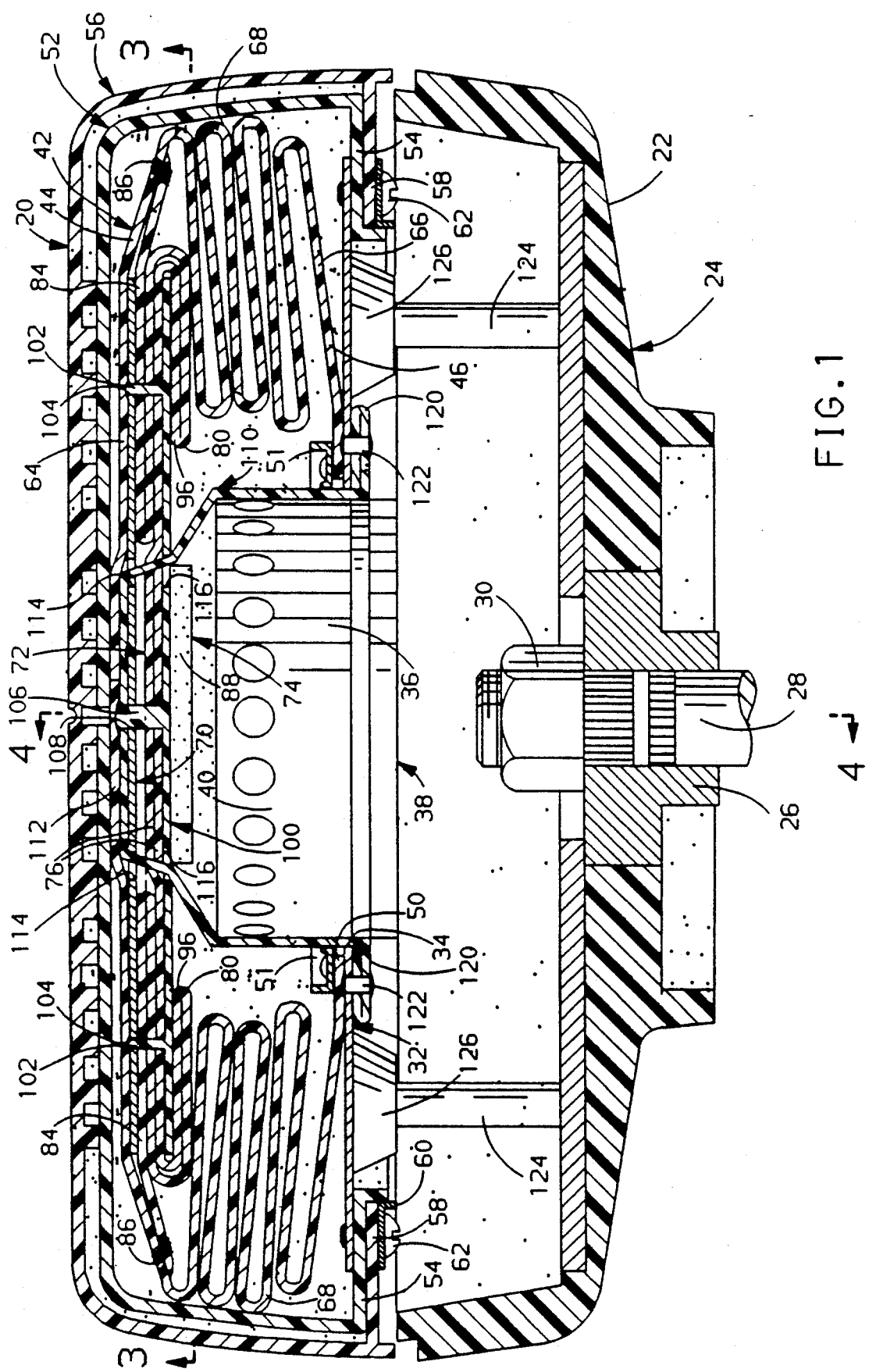
FIG. 1 is a sectional view of an occupant restraint system according to this invention.

Referring now to FIG. 1 of the drawings, an occupant restraint system 20 according to this invention is shown mounted to the hub portion 22 of a vehicle steering wheel 24. The hub portion includes a splined bushing 26 which receives the splined upper end of the vehicle steering shaft 28 and is secured thereto at 30 to secure the vehicle steering wheel 24 to the vehicle steering system.

A generally rectangularly shaped plate or support 32 has a central circular opening 34. The segmented flange 36 of a conventional inflator 38 underlies the lower side of the support 32 around the opening 34. The outlet portion 40 of the inflator projects within the interior of a folded occupant restraint cushion 42. The cushion 42 includes upper and lower or forward and rearward circular members 44 and 46 which are secured together at their circular edge portions 48, FIG. 4. The upper or forward cushion member 44 provides the impact surface engaged by the driver when the cushion is inflated. The lower or rearward cushion member 46 has a central opening 50, the edge portion of which is located underneath a retainer 51. Spaced fasteners secure the segments of flange 36, the edge portion of the opening 50, and retainer 51 to the support 32 as shown in the Frantz et al. application.

The inflator 38 is a conventional gas generator which is actuated to produce gas or pressure fluid when a suitable sensor, either acceleration or velocity or otherwise, senses an actual or impending impact of the vehicle with an obstacle and sends an appropriate signal to the inflator.

A container 52 for the cushion 42 is formed of plastic material and has a generally box-like rectangular shape. The container houses the folded occupant restraint cushion 42 and has a segmented flange 54 which underlies the support 32. An outer decorative cover 56 of plastic material is of the same general shape as the container 52. The cover 56 has a segmented flange 58 which overlies the flange 54 of the container. A retainer 60 overlies the flanges 54 and 58 and is secured at 62 to the support 32 to secure the container and cover to the support 32.

The cover 56 and container 52 have respective molded in lines and molded in perforations so as to separate in pairs of flaps during deployment of the cushion. Reference may be had to U.S. Pat. No. 4,903,986 Cok et al., Occupant Restraint System, issued Feb. 27, 1990 for the details of the cover and container as well as the manner in which the members 44 and 46 of the cushion 42 are folded to provide a generally rectangularly shaped upper wall portion 64, a lower wall portion 66, fan folded side wall portions, not shown, and pleat folded end wall portions 68.

A generally rectangularly shaped reaction plate or member 70 is of the general size of the upper wall portion 64 and seats thereagainst.

Figure 4:
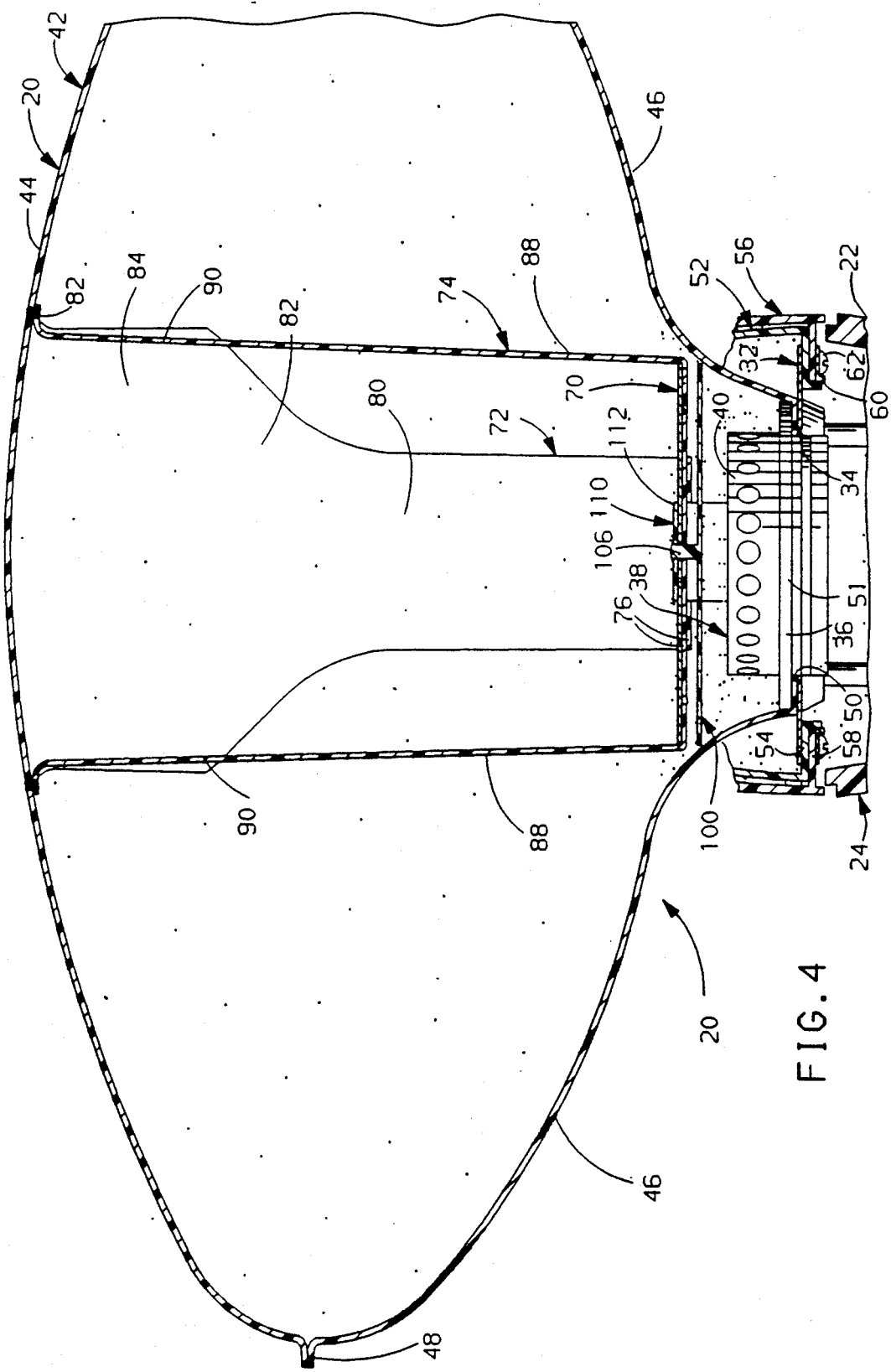
FIG. 4 is a view of a deployed cushion with the upper wall of the cushion tethered.

As shown in FIGS. 2, 3, and 4, like shaped strip members 72 and 74 of flexible material are arranged in cruciform fashion and have their respective bights or center portions 76 crossing each other and the reaction member 70. Each end of the legs 80 of strip member 72 terminates in a truncated shaped flap 82, FIGS. 3 and 4, including a generally rectangularly shaped end portion 84 having its edge sewn or otherwise secured at 86 to the upper wall 44 of cushion 42 adjacent one of the shorter or 3 and 9 o'clock edges of the reaction member 70. The ends of legs 88 of strip member 74 likewise terminate in truncated shaped flaps 90, FIG. 3, each flap including a generally rectangularly shaped end portion 92 which is smaller than an end portion 84 and has its edge sewn or otherwise secured at 94 to the inside of the upper wall 44 of cushion 42 adjacent one of the longer or 6 and 12 o'clock edges of the reaction member 70. The flaps 82 of strip member 72 and the flaps 90 of strip member 74 are arranged in respective pairs which overlap each other and overlie the periphery of the reaction member 70 to pocket the reaction member to the inside of the upper wall 44 of the cushion 42. The flaps 82 of strip member 72 overlap the flaps 90 of strip member 74. Each leg 80 of strip member 72 is folded back over a respective flap 82 thereof, as shown in FIG. 2, and then folded over itself at 96. Likewise, each leg 88 of strip member 74 is folded back over a respective flap 90 and then folded over itself at 98. The folded over legs 88 overlie the folded over legs 80.

The folded over legs 80 and 88 and flaps 82 and 90 are sandwiched between the reaction member 70 and a retainer member 100 which is of the same general shape as the reaction member 70. The retainer member may be formed of plastic material, as indicated, and include a number of integral shearable or frangible pins 102 which extend through the overlapped flaps 82 and 90 of strip members 72 and 74 and through openings 104, FIG. 2, in the reaction member 70. The pins are headed over the reaction member as shown in FIG. 1 to secure the retainer member 100 to the reaction member 70 with the strip members 72 and 74 sandwiched therebetween. The reaction member 70 and retainer member 100 are additionally centrally secured to each other by a pin 106 of the retainer member extending through an opening 108, FIG. 2, of the reaction member and being headed over the reaction member. Alternatively, the pins could be provided with integral heads which snap through the openings 104 and 108 of the reaction member. Although the reaction member and retainer member are shown as formed of metal and plastic, they can be formed of other materials and be secured to each other by other fastening means if desired, provided that the fastening means provided by pins 102 is shearable or frangible, as will be hereinafter set forth.

A flexible member or strap 110 has its bight 112, FIG. 1, looped through generally aligned pairs of slots or openings 114 and 116 in the reaction member 70 and retainer member 100, respectively. The legs of the strap 110 pass around the inflator 38 and through the retainer 51 and the opening 34 in the support 32 to the underside of the support. The ends of the legs are doubled over at 120 and riveted or otherwise secured at 122 to the underside of the support 32 adjacent the opening 50 therethrough.

From the foregoing, it can be seen that the support 32, inflator 38, cushion 42, container 52, cover 56, reaction member 70, strip members 72 and 74, retainer member 100 and strap 110 are assembled together to provide a self-contained restraint system module.

The module is assembled in overlying relationship to the opening of the hub portion 22 of the steering wheel by fasteners, not shown, which extend upwardly through openings in the hub portion 22 and into tapped cylindrical tubes or struts 124 which are secured to downward embossments 126 of support 32, FIG. 1.

When the inflator 38 receives an appropriate signal, the inflator generates gas or pressure fluid which exits into the interior of the folded cushion 42 through the outlet ports in the upper portion 40 of the inflator 38. The pressure fluid initiates unfolding of the fan folded side wall portions and pleat folded end wall portions 68 of the cushion 42 through the separable flaps in the longer or 6 and 12 o'clock side walls and shorter or 3 and 9 o'clock side walls of the container 52 and cover 56 to initiate deployment of the cushion 42 laterally of the occupant, as set forth in the aforenoted Cok et al. patent. During this initial deployment of the cushion 42, the upper wall portion 64 of the cushion 42 remains generally stationary since the pairs of flaps 82 and 90 of the strip members 72 and 74 seal the interface between the periphery of the reaction member 70 and such upper wall portion so that the pressure fluid cannot enter through such interface and impinge against the upper wall portion 64. Thus, the upper or forward wall 44 of the cushion does not initially deploy toward the occupant.

As the volume and pressure of the pressure fluid increase, the side wall portions 68 and end wall portions of the cushion continue to unfold into continuations of the sealed upper wall portion 46 of the cushion 42. When such side and end wall portions are substantially unfolded, they pull the pairs of flaps 82 and 90 from between the reaction member 70 and the retainer member 84 as the fasteners 102 shear from the retainer member. The forward or upper wall 44 of the cushion is then free to deploy with the flaps 82 and 90 normal to or toward the occupant.

As the flaps 82 and 90 move with the forward wall 44 normal to or toward the occupant, the legs 80 and 88 unfold relative to their respective flaps 82 and 90 and to the respective bights or center portions 76 so that the pairs of legs 80 and flaps 82, and pairs of legs 88 and flaps 90 provide tethers which tether the forward wall 44 of the cushion to the reaction member 70, as shown in FIG. 4. The reaction member 70 and retainer member 100 are held against movement by the strap 110.

Should the occupant engage the wall 44 of the deployed cushion 42, the occupant will not feel or engage the flaps 82 and 90 since they are within the cushion 42 and are formed of flexible material.

In order to further ensure that none of the pressure fluid enters the space between the reaction member 70 and the upper wall portion 46 of the cushion 42, the openings 116 in the retainer member 100 can be sealed to the legs of the strap 90 passing therethrough.

The strap 110 can be formed of a multiple folded over piece of material, such as the material of the cushion 42. Further, the portions of the legs of the strap which pass near the outlets of the inflator 38 can be appropriately coated, such as with a silicone base material, to prevent deterioration of their strength.

Thus, this invention provides an occupant restraint system which includes a reaction member pocketed to the inside of the upper or forward wall of the occupant restraint cushion by flap means which form part of tethers tethering the upper wall of the cushion to the reaction member when the cushion is deployed normal to or toward the occupant.

The embodiments of the invention in which an exclusive property or privilege is claimed are defined as follows:

1. An occupant restraint system comprising, support means, an inflatable occupant restraint cushion mounted to the support means and including a lower wall portion secured to the support means, an upper wall portion spaced from the lower wall portion, and folded wall portions interconnecting the upper and lower wall portions, means mounting the lower wall portion to the support means, a source of pressure fluid for inflating and deploying the occupant restraint cushion, a pressure fluid reaction member covering the inside of the upper wall portion, means mounting the reaction member to the support means in overlying relationship to the source of pressure fluid, a plurality of flap means, each arranged in overlapping relationship to a respective peripheral edge portion of the reaction member and to each other, means securing the flap means to the inside of the upper wall portion of the cushion adjacent the peripheral edge portions of the reaction member, the flap means providing a pocket sealing the interface between the reaction member and the upper wall portion of the cushion against the entry of pressure fluid, means releasably locating the flap means in overlapping relationship to the reaction member and to each other until the pressure and volume of pressure fluid within the cushion attain predetermined levels and move the upper wall portion and flap means relative to the reaction member and toward the occupant, and means interconnecting the flap means and the reaction member and cooperating with the flap means to provide tethers interconnecting the reaction member and upper wall portion of the cushion to limit the movement of such upper wall portion relative to the reaction member and toward the occupant.

2. An occupant restraint system comprising, support means, an inflatable occupant restraint cushion mounted to the support means and including a lower wall portion secured to the support means, an upper wall portion spaced from the lower wall portion, and folded wall portions interconnecting the upper and lower wall portions, means mounting the lower wall portion to the support means, a source of pressure fluid for inflating and deploying the occupant restraint cushion, a pressure fluid reaction member covering the inside of the upper wall portion, means mounting the reaction member to the support means in overlying relationship to the source of pressure fluid, a plurality of flap means, each arranged in overlapping relationship to a respective peripheral edge portion of the reaction member and to each other, means securing the flap means to the inside of the upper wall portion of the cushion adjacent the peripheral edge portions of the reaction member, the flap means providing a pocket sealing the interface between the reaction member and the upper wall portion of the cushion against the entry of pressure fluid, means releasably locating the flap means in overlapping relationship to the reaction member and to each other until the pressure and volume of pressure fluid within the cushion attain predetermined levels and move the upper wall portion and flap means relative to the reaction member and toward the occupant, and means extending between pairs of the flap means and over the reaction member and cooperating with the flap means to provide tethers interconnecting the reaction member and upper wall portion of the cushion to limit the movement of such upper wall portion relative to the reaction member and toward the occupant.

3. An occupant restraint system comprising, support means, an inflatable occupant restraint cushion mounted to the support means and including a lower wall portion secured to the support means, an upper wall portion spaced from the lower wall portion, and folded wall portions interconnecting the upper and lower wall portions, means mounting the lower wall portion to the support means, a source of pressure fluid for inflating and deploying the occupant restraint cushion, a pressure fluid reaction member covering the inside of the upper wall portion, means mounting the reaction member to the support means in overlying relationship to the source of pressure fluid, a plurality of flap means arranged in pairs, the flap means of each pair overlapping oppositely disposed respective peripheral edge portions of the reaction member, and overlapping each other to provide a pocket sealing the interface between the reaction member and the upper wall portion of the cushion against the entry of pressure fluid, means securing the flap means to the inside of the upper wall portion of the cushion adjacent respective peripheral edge portions of the reaction member, means releasably locating the flap means in overlapping relationship to the reaction member and to each other until the pressure and volume of pressure fluid within the cushion attain predetermined levels and move the upper wall portion and flap means relative to the reaction member and toward the occupant, and elongated means looped between the flap means of each pair and over the reaction member and cooperating with the flap means to provide tethers interconnecting the reaction member and upper wall portion of the cushion to limit the movement of such upper wall portion relative to the reaction member and toward the occupant.

4. An occupant restraint system comprising, support means, an inflatable occupant restraint cushion mounted to the support means and including a lower wall portion secured to the support means, an upper wall portion spaced from the lower wall portion, and folded wall portions interconnecting the upper and lower wall portions, means mounting the lower wall portion to the support means, a source of pressure fluid for inflating and deploying the occupant restraint cushion, a pressure fluid reaction member covering the inside of the upper wall portion, means mounting the reaction member to the support means in overlying relationship to the source of pressure fluid, a pair of elongated members having flap means at each end thereof, means securing the flap means of each member to the inside of the upper wall portion of the cushion adjacent opposite peripheral edge portions of the reaction member to locate the flap means in overlapping relationship to respective peripheral edge portions of the reaction member and to each other and loop the elongated members around the reaction member, the flap means thereby providing a pocket sealing the interface between the reaction member and the upper wall portion of the cushion against the entry of pressure fluid, means releasably locating the flap means in overlapping relationship to the reaction member and to each other until the pressure and volume of pressure fluid within the cushion attain predetermined levels and move the upper wall portion and flap means relative to the reaction member and toward the occupant, the elongated members providing tethers interconnecting the reaction member and upper wall portion of the cushion to limit the movement of such upper wall portion relative to the reaction member and toward the occupant.

* * * * *